July 12, 1966 R. PARKER III 3,260,897
PROTECTION DEVICE FOR PLURAL PHASE ELECTRICAL LOADS CONSISTING
OF A PLURALITY OF MONITORING RELAYS CONTROLLING THE
ENERGIZATION OF THE LOAD
Filed Aug. 23, 1963
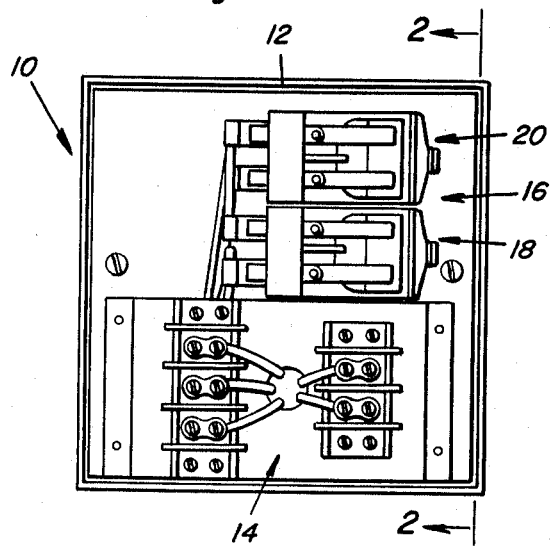
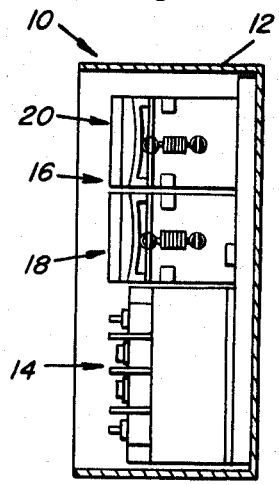
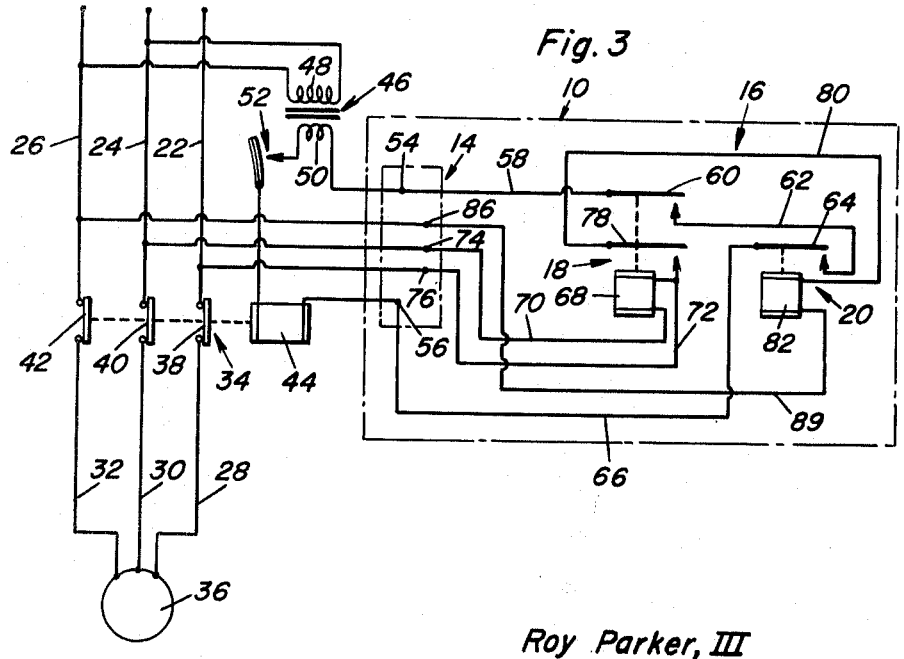
Roy Parker, III
INVENTOR.

United States Patent Office 3,260,897
Patented July 12, 1966

3,260,897
PROTECTION DEVICE FOR PLURAL PHASE ELECTRICAL LOADS CONSISTING OF A PLURALITY OF MONITORING RELAYS CONTROLLING THE ENERGIZATION OF THE LOAD
Roy Parker III, P.O. Box 774, Americus, Ga.
Filed Aug. 23, 1963, Ser. No. 304,020
3 Claims. (Cl. 317—46)

This invention relates to protection of electrical loads in polyphase power systems and more particularly to the protection of a polyphase load from a single phase condition should any one of the incoming power phases fail.

It is therefore a primary object of the present invention to provide a polyphase load protection device which is simple to manufacture, install and operate. The protection device therefore does not require any rewiring of the power supply through the protection device.

Another object of the present invention is to provide a polyphase load protection device associated with the load circuit breaker so as to open the power circuit in response to failure of any one of the power phase lines and wherein the circuit breaker is automatically reset when power is restored to all of the power phases without requiring any supervisory control.

A further object of the present invention is to provide a protection device for polyphase loads having a circuit breaker associated therewith wherein electrical connections through the protection device are made only on the power input side of the circuit breaker.

In accordance with the foregoing objects, the load protection device of the present invention involves normally energized relays which are deenergized only upon phase line failure. The relays are therefore simply connected to the power phase lines on the input side of the circuit breaker so that an energizing circuit for the holding coil thereof is completed only when all of the relays are energized. At least one of the relays is therefore connected across two of the power lines and is provided with a relay switch arranged to establish the connection of another relay across a different pair of power lines so that one or the other of the relays will be deenergized in the event power failure occurs in any one of the phase lines. Series connected switches are therefore associated with the relays so that simultaneous energization of all of the relays is required in order to close the series connected switches by means of which the energizing circuit for the circuit breaker holding coil is completed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of one physical arrangement of the protection device.

FIGURE 2 is a side sectional view of the protection device taken substantially through a plane indicated by section line 2—2 in FIGURE 1.

FIGURE 3 is an electrical circuit diagram illustrating the protection device in association with a polyphase system.

Referring now to the drawings in detail, it will be observed from FIGURES 1 and 2, that the protection device generally referred to by reference numeral 10 may be enclosed within any suitable housing 12 and is provided with a terminal connecting assembly 14 through which electrical connections are made to the polyphase system with which the protection device is associated. Also mounted within the housing 12, is a relay section 16 including a plurality of relay devices such as the two relay devices 18 and 20.

Referring now to FIGURE 3, it will be observed that the protection device 10 is shown connected to a polyphase system including three power lines 22, 24 and 26 respectively connected to load phase lines 28, 30 and 32 by the circuit breaker 34 so as to furnish power to a load such as a three phase motor 36. The circuit breaker 34 is of the type which includes three contactor elements 38, 40 and 42 establishing electrical connections between the power lines and the load lines when the holding coil 44 is energized. Power for energizing the holding coil 44 is derived from two of the power lines by means of a transformer 46. Accordingly, the transformer includes a primary 48 connected across the power lines 24 and 26 and a secondary 50 one terminal of which is electrically connected to one terminal of the holding coil 44 through a thermal overload switch device 52. The other terminal of the secondary 50 is connected to a terminal post 54 of the component 14 associated with the protection device. The holding coil 44 is therefore also connected to the terminal post 56 so that an energizing circuit for the holding coil may be completed by means of the protection device under proper operating conditions.

The transformer secondary 50 is therefore electrically connected through the terminal post 54 and the conductor 58 to a relay switch 60 associated with the first relay device 18. The relay switch 60 is connected in series with a relay switch 64 associated with the second relay device 20 by the conductor 62. The relay switch 64 is connected by the conductor 66 to the terminal post 56 to which the holding coil 44 is connected so as to complete the energizing circuit only when both relay switches 60 and 64 are closed. Both of the relay switches 60 and 64 will however be closed only when both of the relay devices 18 and 20 are simultaneously energized.

The relay device 18 includes a relay coil 68 connected by the conductors 70 and 72 to terminal posts 74 and 76 to which the power lines 22 and 24 are electrically connected on the input side of the circuit breaker to the power phase lines so that the first relay device 18 will be energized whenever power is applied to the power lines 22 and 24. Energization of the relay coil 68 will therefore close the series connected relay switch 60 as well as the relay switch 78 connected by the conductor 80 to the relay coil 82 of the second relay device 20. The relay coil 82 is therefore also connected by the conductor 84 to the terminal post 86 to which the third power line 26 is connected. It will therefore be apparent, that upon energization of the relay coil 68 of the first relay device 18, closing of its relay switch 78 will establish an electrical connection across a different pair of power lines so as to energize the relay coil 82. Accordingly energization of both relay coils will occur only when full power is supplied to all of the power lines.

From the foregoing description, the construction, operation and utility of the protection device will be apparent. It will therefore be appreciated, that a permanent electrical connection is established across two of the power lines on the input side of the circuit breaker for the first relay device with the third power line being connected to the relay coil of the second relay device. Energization of the second relay device is therefore dependent upon energization of the first relay device so as to insure that at least one of the relay devices will be deenergized should any one of the power lines fail. Also, simultaneous energization of all relay devices is required in order to complete an energizing circuit in order to maintain the holding coil of the circuit breaker energized. Therefore, after failure in any of the power lines causes the circuit breaker to open, reset of the circuit breaker will be automatic upon restoration of power to all of the power lines. The protection device of the present invention, is therefore easy to install, reliable in operation and economical to produce.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a circuit breaker for polyphase power lines connected to a load having a circuit holding coil energized by power supplied from two of said power lines to hold the circuit breaker closed, a power failure protection device comprising a plurality of relay devices, terminal means connecting said relay devices to the power lines on the input side of the circuit breaker for energization of one of the relay devices including conductors connecting said one of the relay devices across two of the powers lines, relay switch means closed in response to energization of said one relay device for connecting all of the relay devices across different pairs of the power lines respectively to simultaneously energize all of the relay devices, and means responsive to deenergization of any of said relay devices for deenergizing said holding coil and automatically reenergizing the holding coil upon restoration of power to all of said power lines.

2. In a polyphase system having at least three power lines connected to three load lines through a circuit breaker maintained closed by a holding coil connected by an energizing circuit to two of said power lines, a protective device comprising a first relay coil connected across two of said power lines for energization thereof, a second relay coil connected to a third of said power lines, said relay coils being connected to the power lines on the input side of the circuit breaker, relay switch means closed in response to energization of said first relay coil to connect the second relay coil to one of said two power lines for simultaneous energization of both relay coils and series-connected switch means maintained closed by simultaneous energization of said relay coils for completing said energizing circuit for the holding coil.

3. In combination with a circuit breaker and an operating coil energized to close the circuit breaker for connecting plural phase power lines to a load, a protective system comprising a first relay device connected across two of said power lines in bypass relation to the circuit breaker, a second relay device, relay operated switch means responsive to energization of the first relay device for connecting the second relay device across another two of said power lines, said relay devices being connected to the power lines on the input side of the circuit breaker, an inductive circuit coupled to said power lines for conducting energizing current through the operating coil and series connected switch means actuated by said relay devices for completing the inductive circuit only during concurrent energization of all of the relay devices by full phase voltage across the respective power lines.

References Cited by the Examiner

UNITED STATES PATENTS

| | | | |
|---|---|---|---|
| 1,314,332 | 8/1919 | Jones | 317—46 |
| 1,646,028 | 10/1927 | Lewis et al. | 317—46 X |
| 2,280,945 | 4/1942 | Gamel et al. | 317—31 X |

FOREIGN PATENTS 221,207   3/1922   Germany.

STEPHEN W. CAPELLI, *Primary Examiner.*

SAMUEL BERSTEIN, *Examiner.*

R. V. LUPO, *Assistant Examiner.*